US011545033B2

United States Patent
Li et al.

(10) Patent No.: US 11,545,033 B2
(45) Date of Patent: Jan. 3, 2023

(54) EVALUATION FRAMEWORK FOR PREDICTED TRAJECTORIES IN AUTONOMOUS DRIVING VEHICLE TRAFFIC PREDICTION

(71) Applicants: Baidu USA LLC, Sunnyvale, CA (US); Baidu.com Times Technology (Beijing) Co., Ltd., Beijing (CN)

(72) Inventors: Liyun Li, San Jose, CA (US); Jinghao Miao, Sunnyvale, CA (US); Zhongpu Xia, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 1083 days.

(21) Appl. No.: 15/542,404

(22) PCT Filed: Jun. 22, 2017

(86) PCT No.: PCT/CN2017/089487
§ 371 (c)(1),
(2) Date: Jul. 7, 2017

(87) PCT Pub. No.: WO2018/232680
PCT Pub. Date: Dec. 27, 2018

(65) Prior Publication Data
US 2018/0374359 A1    Dec. 27, 2018

(51) Int. Cl.
*G08G 1/16*    (2006.01)
*G06N 3/08*    (2006.01)
(Continued)

(52) U.S. Cl.
CPC ........... *G08G 1/163* (2013.01); *G05D 1/0221* (2013.01); *G06K 9/6264* (2013.01); *G06N 3/04* (2013.01);
(Continued)

(58) Field of Classification Search
CPC ..... G06K 9/6264; G05D 1/0221; G01C 21/20
See application file for complete search history.

(56) References Cited

U.S. PATENT DOCUMENTS 9,248,834 B1    2/2016  Ferguson et al.
9,604,359 B1*   3/2017  Grotmol ................ G06N 3/049
(Continued)

FOREIGN PATENT DOCUMENTS

CN    101837781 A    9/2010
CN    104484911 A    4/2015
(Continued)

OTHER PUBLICATIONS

'Models for Pedestrian Trajectory Prediction and Navigation in Dynamic Environments' Kerfs, May 2017.*
(Continued)

*Primary Examiner* — Michael J Huntley
*Assistant Examiner* — Peter D Coughlan
(74) *Attorney, Agent, or Firm* — Womble Bond Dickinson (US) LLP

(57) ABSTRACT

According to one embodiment, when a predicted trajectory is received, a set of one or more features are extracted from at least some of the trajectory points of the predicted trajectory. The predicted trajectory is predicted using a prediction method or algorithm based on perception data perceiving an object within a driving environment surrounding an autonomous driving vehicle (ADV). The extracted features are fed into a predetermined DNN model to generate a similarity score. The similarity score represents a difference or similarity between the predicted trajectory and a prior actual trajectory that was used to train the DNN model. The similarity score can be utilized to evaluate the prediction method that predicted the predicted trajectory.

21 Claims, 9 Drawing Sheets

(51) Int. Cl.
*G05D 1/02* (2020.01)
*G06V 20/58* (2022.01)
*G06N 3/04* (2006.01)
*G06K 9/62* (2022.01)

(52) U.S. Cl.
CPC .............. *G06N 3/08* (2013.01); *G06V 20/58* (2022.01); *G08G 1/166* (2013.01); *G05D 1/021* (2013.01); *G05D 2201/0213* (2013.01)

(56) References Cited

U.S. PATENT DOCUMENTS

| | | | |
|---|---|---|---|
| 10,255,525 B1* | 4/2019 | Totolos, Jr. | G06T 7/13 |
| 2009/0245573 A1* | 10/2009 | Saptharishi | G06K 9/52 |
| | | | 382/103 |
| 2012/0253596 A1 | 10/2012 | Ibrahim et al. | |
| 2012/0306663 A1* | 12/2012 | Mudalige | G08G 1/163 |
| | | | 340/903 |
| 2013/0080019 A1* | 3/2013 | Isaji | B60W 30/18145 |
| | | | 701/96 |
| 2015/0074026 A1* | 3/2015 | Szatmary | G06N 3/049 |
| | | | 706/23 |
| 2015/0292894 A1 | 10/2015 | Goddard et al. | |
| 2016/0359697 A1* | 12/2016 | Scheib | G06N 99/00 |
| 2017/0024877 A1* | 1/2017 | Versace | G01S 13/86 |
| 2017/0039856 A1* | 2/2017 | Park | G08G 1/166 |
| 2017/0120902 A1* | 5/2017 | Kentley | B60W 10/04 |
| 2017/0161009 A1* | 6/2017 | Ogisu | G06F 3/1446 |

FOREIGN PATENT DOCUMENTS

| | | |
|---|---|---|
| CN | 105741595 A | 7/2016 |
| JP | 2007-257274 A | 10/2007 |
| KR | 10-1500168 B1 | 3/2015 |
| KR | 10-2017-0057084 A | 5/2017 |

OTHER PUBLICATIONS

'Sequential Discriminant Error Minimization: The Theory and Its Application to Real-Time Object Recognition': Saptharishi, 2005, Carnegie Mellon University.*
Goodfellow, Ian, "NIPS 2016 Tutorial: Generative Adversarial Networks", Available Online at <https://arxiv.org/pdf/1701.00160.pdf>, Apr. 3, 2017, 57 pages.
Kerfs, Jeremy, "Models for Pedestrian Trajectory Prediction and Navigation in Dynamic Environments", Thesis, Faculty of California Polytechnic State University, Master of Science in Computer Science, May 2017, 146 pages.
Khosroshahi et al., "Surround vehicles trajectory analysis with recurrent neural networks", 2016 IEEE 19th International Conference on Intelligent Transportation Systems (ITSC), IEEE, Nov. 1, 2016, pp. 2267-2272.
Kuefler et al., "Imitating Driver Behavior with Generative Adversarial Networks", Available Online at: <https://arxiv.org/pdf/1701.06699.pdf>, Jan. 24, 2017, 8 pages.
Alexandre Alahi, et al., "Social LSTM: Human Trajectory Prediction in Crowded Spaces," 2016 IEEE Conference on Computer Vision and Pattern Recognition, Jun. 27, 2016.

* cited by examiner

EVALUATION FRAMEWORK FOR PREDICTED TRAJECTORIES IN AUTONOMOUS DRIVING VEHICLE TRAFFIC PREDICTION

CROSS-REFERENCE TO RELATED APPLICATION

This patent application is a U.S. National Phase Application under 35 U.S.C. § 371 of International Application No. PCT/CN2017/089487, filed Jun. 22, 2017, entitled "EVALUATION FRAMEWORK FOR PREDICTED TRAJECTORIES IN AUTONOMOUS DRIVING VEHICLE TRAFFIC PREDICTION," which is incorporated by reference herein by its entirety.

TECHNICAL FIELD

Embodiments of the present disclosure relate generally to operating autonomous vehicles. More particularly, embodiments of the disclosure relate to evaluating traffic predictions of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Traffic prediction is a very important problem to solve when building autonomous driving vehicle software. While a perception module collects sensor data and generates structured detected objects (such as vehicles, cyclists, and pedestrians), a prediction module needs to actually predict the behavior of these objects. The output of prediction includes predicted trajectories, which represent the possible spatial-temporal positions that an object will be at in the near future. While it is easy to evaluate the predicted "behavior" on the concrete categorical level, it is very difficult to numerically and objectively measure the actual similarity between predicted trajectories and actual trajectories.

SUMMARY

Embodiments of the present disclosure provide a computer-implemented method for evaluating predictions of trajectories by autonomous driving vehicles, a non-transitory machine-readable medium, and a data processing system.

In an aspect of the disclosure, the computer-implemented method for evaluating predictions of trajectories by autonomous driving vehicles comprises: receiving a predicted trajectory of an object that was generated using a prediction method based on perception data perceiving the object within a driving environment surrounding an autonomous driving vehicle (ADV); for at least some trajectory points selected from a plurality of trajectory points of the predicted trajectory, extracting a plurality of features from the selected trajectory points; applying a deep neural network (DNN) model to the extracted features to generate a similarity score, wherein the similarity score represents a similarity between the predicted trajectory and a prior actual trajectory modeled by the DNN model; and determining an accuracy of the prediction method based on the similarity score.

In another aspect of the disclosure, the non-transitory machine-readable medium has instructions stored therein, which when executed by a processor, cause the processor to perform operations. The operations comprises: receiving a predicted trajectory of an object that was generated using a prediction method based on perception data perceiving the object within a driving environment surrounding an autonomous driving vehicle (ADV); for at least some trajectory points selected from a plurality of trajectory points of the predicted trajectory, extracting a plurality of features from the selected trajectory points; applying a deep neural network (DNN) model to the extracted features to generate a similarity score, wherein the similarity score represents a similarity between the predicted trajectory and a prior actual trajectory modeled by the DNN model; and determining an accuracy of the prediction method based on the similarity score.

In a further aspect of the disclosure, the data processing system comprises: a processor; and a memory coupled to the processor to store instructions, which when executed by the processor, cause the processor to perform operations. The operations includes: receiving a predicted trajectory of an object that was generated using a prediction method based on perception data perceiving the object within a driving environment surrounding an autonomous driving vehicle (ADV), for at least some trajectory points selected from a plurality of trajectory points of the predicted trajectory, extracting a plurality of features from the selected trajectory points, applying a deep neural network (DNN) model to the extracted features to generate a similarity score, wherein the similarity score represents a similarity between the predicted trajectory and a prior actual trajectory modeled by the DNN model, and determining an accuracy of the prediction method based on the similarity score.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
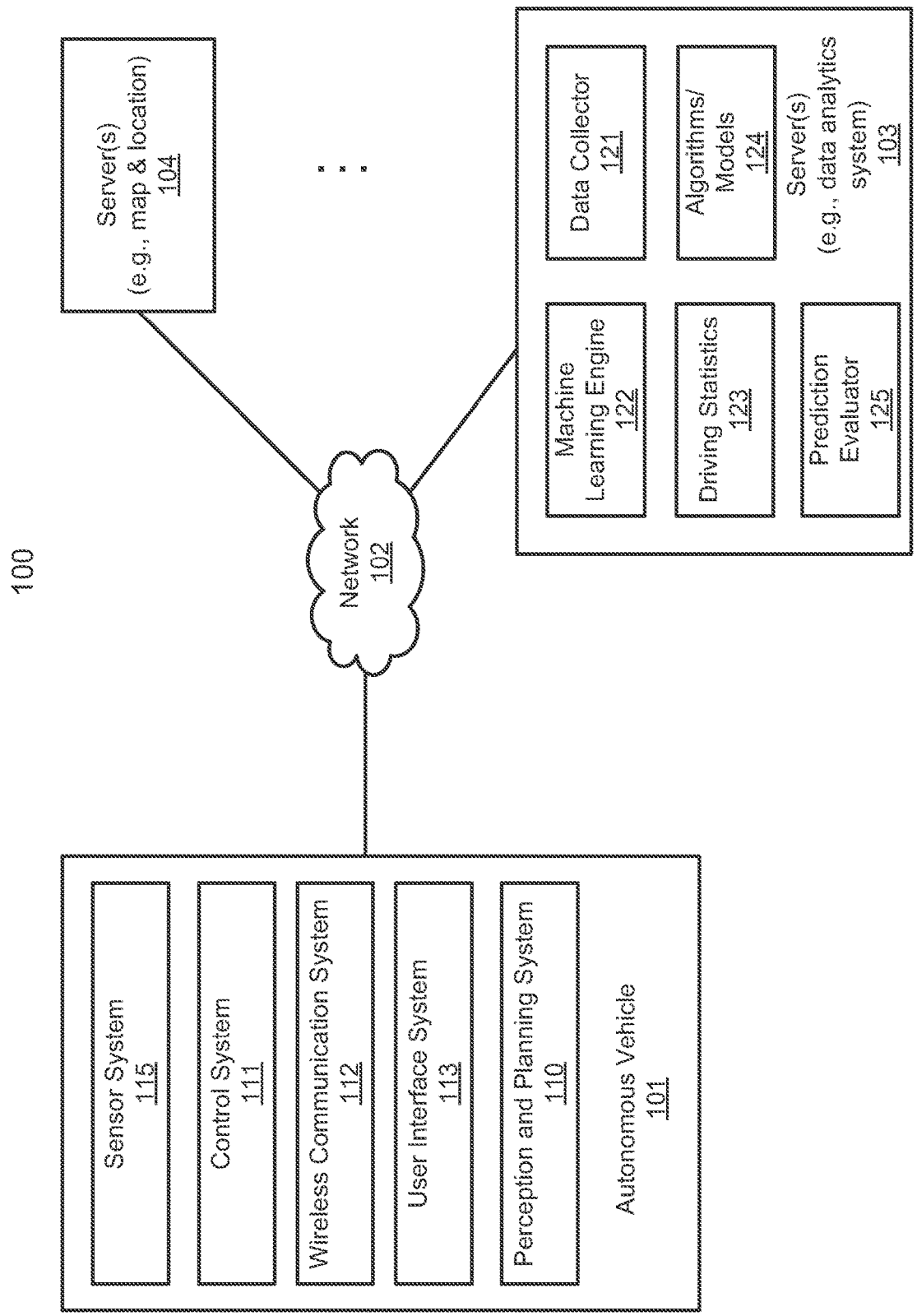
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In autonomous driving software system, the perception and prediction modules are two important modules to extract "objective" and "subjective" information. While a perception module extracts more objective information such as object existence, velocity, position and heading from raw sensor data, a prediction module is responsible for computing "predictions." These predictions include behavior level predictions. For example, at a certain moment, if a detected vehicle at a certain lane with certain speed will change from its current lane to an adjacent lane. Such predictions are more concretely instantiated with spatial-temporal trajectory points. These trajectories with points are heavily leverage by downstream modules (such as motion planning and control), to make safe and reasonable autonomous driving decisions.

The perception module consumes raw sensor data, which may include, but not limited to point-cloud, camera-images, global positioning system (GPS), and/or radar. The perception module is responsible for detecting perceptional objects, and augment them with information such as position, speed and heading. Such information are more "objective." The prediction module is responsible for predicting the behavior all these objects in the near future. Such predictions are usually firstly computed at the meta-behavior level, such as whether an object will keep its current lane or will change to another lane or even make a stop. After such behavior level predictions are made, these predictions are instantiated with actual concrete trajectories. Trajectories are represented as a collection of "trajectory points," where each point indicates a future position of the object, along with predicted speed and heading at that point. The embodiments of the disclosure are to systematically compute the similarities between these predicted trajectories and the actual trajectories that the object take.

According to some embodiments, a deep neural network (DNN) is trained and utilized to solve the similarity evaluation problem by training an evaluation network and to use this network to determine the difference or similarity of the predicted trajectories and the actual trajectories in order to evaluate the accuracy of the prediction methods that are utilized to generate the predicted trajectories. In one embodiment, the predicted trajectories are utilized as negative examples and the actual trajectories as positive examples. A DNN network is built from these examples with designed feature. If the shape of the predicted trajectories are from different distributions of the actual trajectory, the network will have the discriminating power to figure out an "actual" trajectory vs. a "predicted" trajectory. Thus if some improvements are made in generating better trajectories, and these predicted trajectories are fed into the network, the trained network will tend to classify the "predicted trajectory" more as "actual trajectory" by giving a score close to a predetermined value (e.g., one). In this configuration, one will have a genetic and novel way to evaluate the similarities of predicted trajectories against actual trajectory.

According to one aspect of the disclosure, when a predicted trajectory is received, a set of one or more features are extracted from at least some of the trajectory points of the predicted trajectory. The predicted trajectory is predicted using a prediction method or algorithm based on perception data perceiving an object within a driving environment surrounding an autonomous driving vehicle (ADV). The extracted features are fed into a predetermined DNN model to generate a similarity score. The similarity score represents a difference or similarity between the predicted trajectory and a prior actual trajectory that was used to train the DNN model. The similarity score can be utilized to evaluate the prediction method that predicted the predicted trajectory.

For example, a similarity score closer to 1 indicates that the predicted trajectory is more likely close to the actual trajectory the corresponding object likely moves in the near future, which implies that the predicted method accurately predicts the potential movement of the object. Otherwise if the similarity score is closer to −1, it indicates that the actual trajectory deviates from the predicted trajectory, which implies that the predicted method may needs an improvement or modification. By using a DNN model to systematically generate a similarity score as an evaluation score, the predicted method for predicting trajectories of objects can be systematically evaluated. As a result, the predicted method or methods can be fine-tuned and improved based on the evaluation scores.

According to another aspect of the disclosure, a DNN model or models may be trained based on a large amount of prior driving statistics, including the predicted trajectories and actual trajectories corresponding to the predicted trajectories captured in the past. For each pair of the predicted trajectory and the corresponding actual trajectory, a set of predicted features is extracted from the predicted trajectory and a set of actual features is extracted from the corresponding actual trajectory. A DNN network or model is trained based on the predicted features and the actual features. The actual features are utilized as positive examples while the predicted features are utilized as negative examples to train the DNN model. The model can learn based on the predicted features in view of the corresponding features to produce a similarity score. The similarity score represents the difference or similarity between a trajectory represented by the predicted features and an actual trajectory represented by the actual features. A similarity score closer to a first predetermined value (e.g., 1) indicates that the predicted trajectory is similar to the corresponding actual trajectory. A similarity score closer to a second predetermined value (e.g., −1) indicates that the predicted trajectory is dissimilar to the corresponding actual trajectory. Using a large amount of predicted trajectories and corresponding actual trajectories, the DNN model or models can be trained more accurately.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
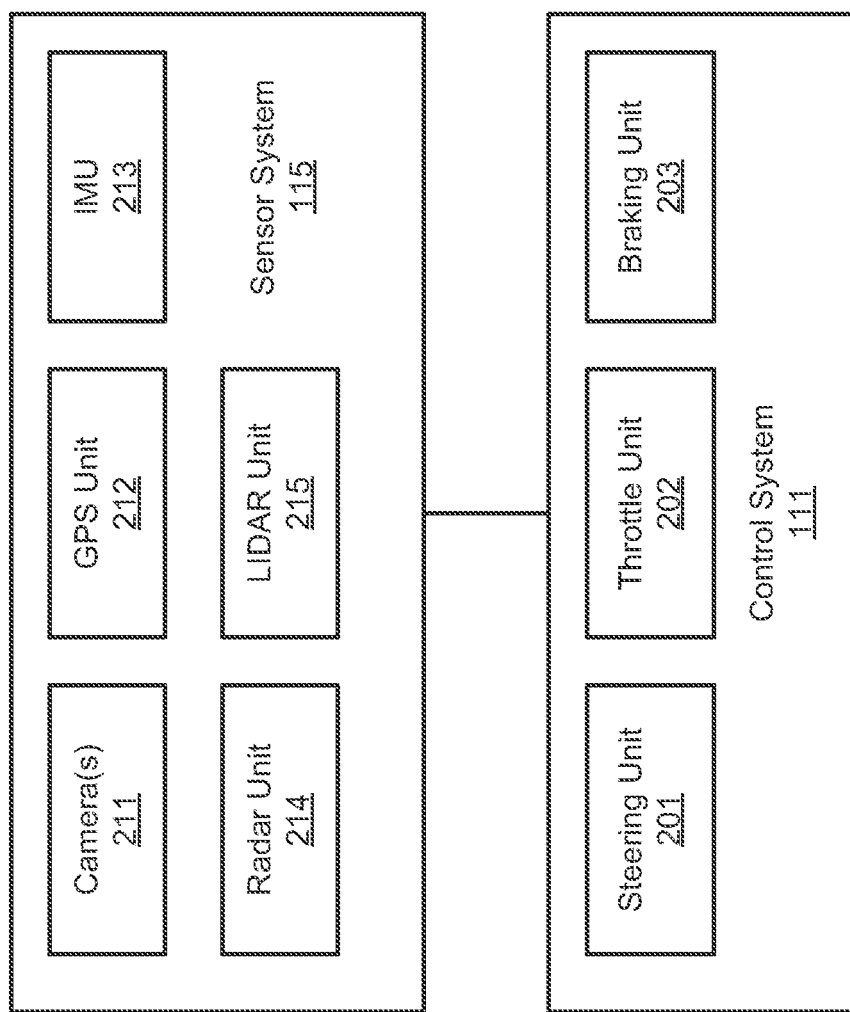
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, models 124 may include one or more DNN models to determine a similarity between a predicted trajectory of an object and an actual trajectory of the object. A deep neural network (DNN) is trained based on driving statistics 123 and utilized to solve the similarity evaluation problem by training an evaluation network. The DNN model(s) are used to determine the difference or similarity of the predicted trajectories and the actual trajectories in order to evaluate the accuracy of the prediction methods that are utilized to generate the predicted trajectories. Driving statistics 123 may include the predicted trajectories of a variety of objects perceived by a variety of ADVs using one or more predicted methods or algorithms, which may be captured and stored in a persistent storage device of the ADVs. In addition, each ADV may further capture the actual trajectories of the objects based on the perception data, which may also be stored in the persistent storage device.

In one embodiment, the predicted trajectories are utilized as negative examples and the actual trajectories as positive examples by machine learning engine 122 to train DNN models 124. A DNN network is built from these examples with designed feature. If the shape of the predicted trajectories are from different distributions of the actual trajectory, the network will have the discriminating power to figure out an "actual" trajectory vs. a "predicted" trajectory. Thus if some improvements are made in generating better trajectories, and these predicted trajectories are fed into the network, the trained network will tend to classify the "predicted trajectory" more as "actual trajectory" by giving a score close to a predetermined value (e.g., one). The DNN models 124 can then be utilized to evaluate future trajectory predictions, for example, by prediction evaluation system or module 125.

Figure 3:
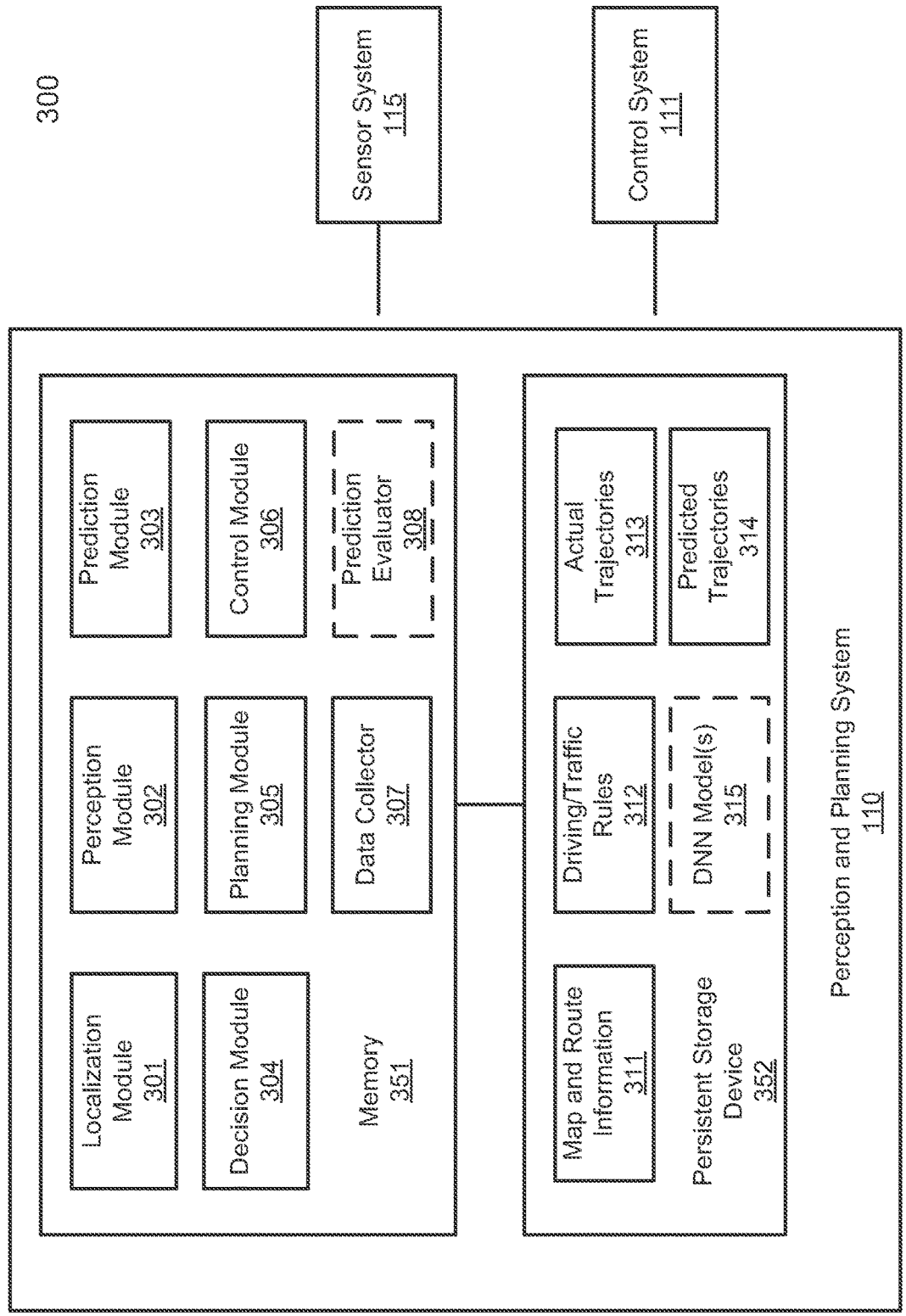
FIG. 3 is a block diagram illustrating an example of a perception and planning system used with an autonomous vehicle according to one embodiment.

FIG. 3 is a block diagram illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, data collector 307, and prediction evaluation module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection.

If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, data collector 307 collects data from modules 301-306 and stores the data in persistent storage device 352. For example, data collector 307 collects actual trajectories from perception module 302 and store the collected actual trajectories in persistent storage device 352 as part of actual trajectories 313. Data collector 307 may further collect predicted trajectories from prediction module 303 and store the predicted trajectories in persistent storage device 352 as part of predicted trajectories 314. Actual trajectories 313 and predicted trajectories 314 can be utilized to train a DNN model, such as DNN models 315 (also referred to as prediction evaluation models), to evaluate the performance of prediction module 303, for example, by optional prediction evaluation module or system 308, which may be implemented as part of prediction evaluator 125 of FIG. 1. Alternatively, actual trajectories 313 and predicted trajectories 314 can be centralized processed to train the DNN models by a data analytics system such as data analytics system 103.

Figure 4:
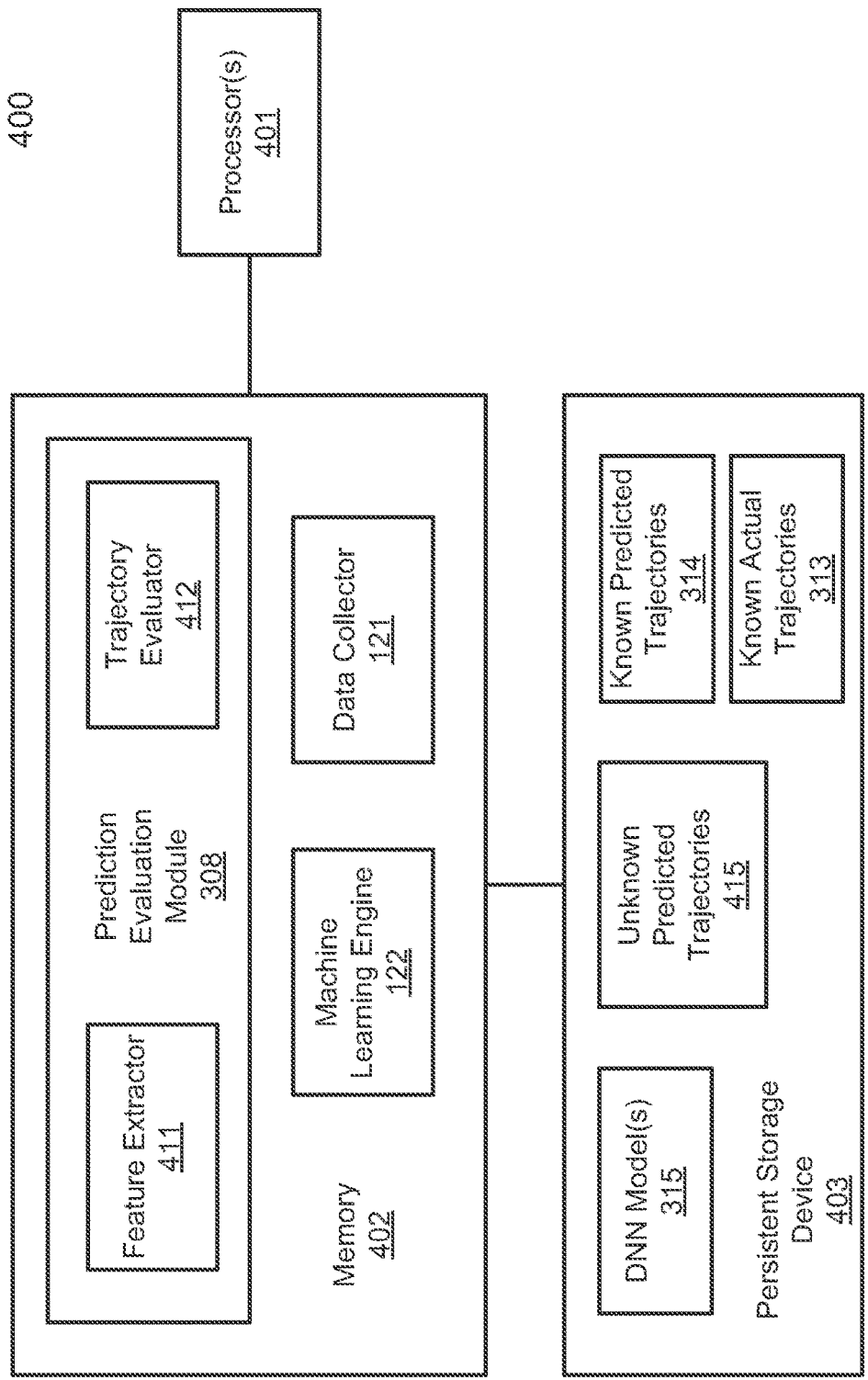
FIG. 4 is a block diagram illustrating a data analytics system according one embodiment.

FIG. 4 is a block diagram illustrating a data analytics system according one embodiment. System 400 may be implemented as a part of system 103 of FIG. 1. Referring to FIG. 4, system 400 includes machine-learning engine 122, data collector 121, and prediction evaluation module 308 loaded into memory 402 and executed by one or more processors 401. In one embodiment, data collector 121 collects driving statistics from a variety of ADVs that drive on a variety of roads under different driving environments. Each of the ADVs perceives and predicts trajectories of objects, capturing actual trajectories of the objects and storing corresponding predicted trajectories predicted by respective prediction modules of the ADVs. The actual trajectories and predicted trajectories are then collected by data collector 121 and stored as part of known actual trajectories 313 and known predicted trajectories 314 in persistent storage device 403. The term of "known trajectories" refer to prior trajectories to be utilized as a training set of trajectories for the purpose of training a prediction evaluation model such as DNN models 315.

Based on the known actual trajectories 313 and known predicted trajectories 314, machine learning engine 122 is configure to train DNN models 315 based on features extracted from known actual trajectories 313 and known predicted trajectories 314. According to one embodiment, DNN model or models 315 may be trained based on a large amount of prior driving statistics, including known predicted trajectories 314 and known actual trajectories 313 corresponding to the predicted trajectories captured in the past.

Figure 5:
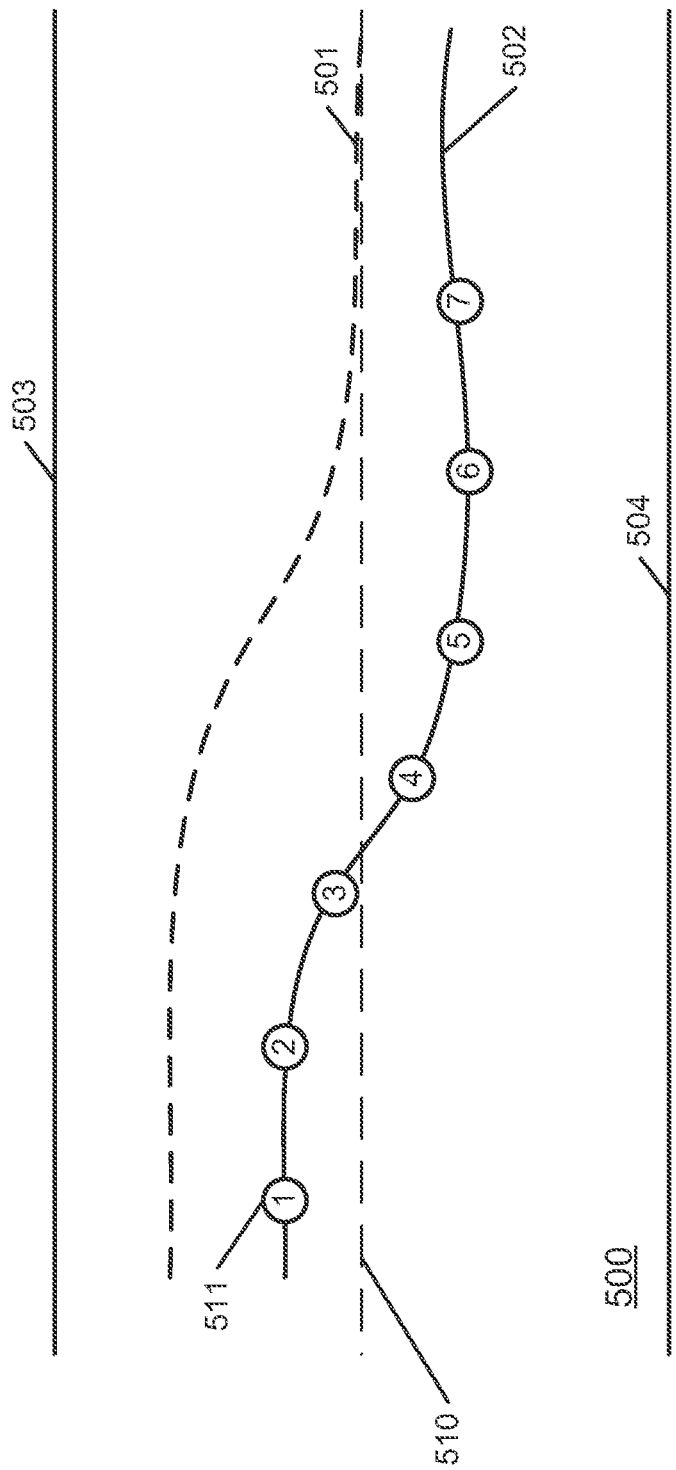
FIG. 5 is a diagram illustrating an example of an actual trajectory and a predicted trajectory.

Referring to FIG. 5, in this example, it is assumed that known actual trajectory 501 of an object has been captured while the object is travelling through lane 500, for example, by perception module 302 and known predicted trajectory 502 of the object has been generated by prediction module 303 of an ADV. Predicted trajectory 502 includes a sequence of trajectory points such as trajectory point 511, also referred to lane points. Each trajectory point is associated with a set of metadata describing the trajectory point. The metadata may include information identifying a lane in which the object is moving, a speed of the object, a heading direction of the object, and/or a location of the object, etc., at a particular moment represented by the corresponding trajectory point.

For at least some pairs of trajectory points of the predicted trajectory and the corresponding actual trajectory, a set of predicted features is extracted from predicted trajectory 502 and a set of actual features is extracted from corresponding actual trajectory 501. A DNN network or model is trained based on the predicted features and the actual features. The actual features are utilized as positive examples while the predicted features are utilized as negative examples to train the DNN model.

In one embodiment, the features of a trajectory point include a set of physical attributes and a set of trajectory related attributes. The physical attributes include, but are not limited to, a relative heading direction, a speed, a relative location (e.g., longitude and latitude) with respect to a starting point of the trajectory, and an arrival time of the object at a particular moment represented by the corresponding trajectory point. The trajectory related attributes include, but are not limited to, a lane identifier (ID) identifying a particular lane in which the object is moving, a direction of the lane (e.g., turning or curved to left or right), a distance to the boundary or curb of the lane, a difference between the heading direction of the object and the direction of the lane at the moment, and/or a distance between the trajectory point and the centerline of the lane at the moment.

Figure 6:
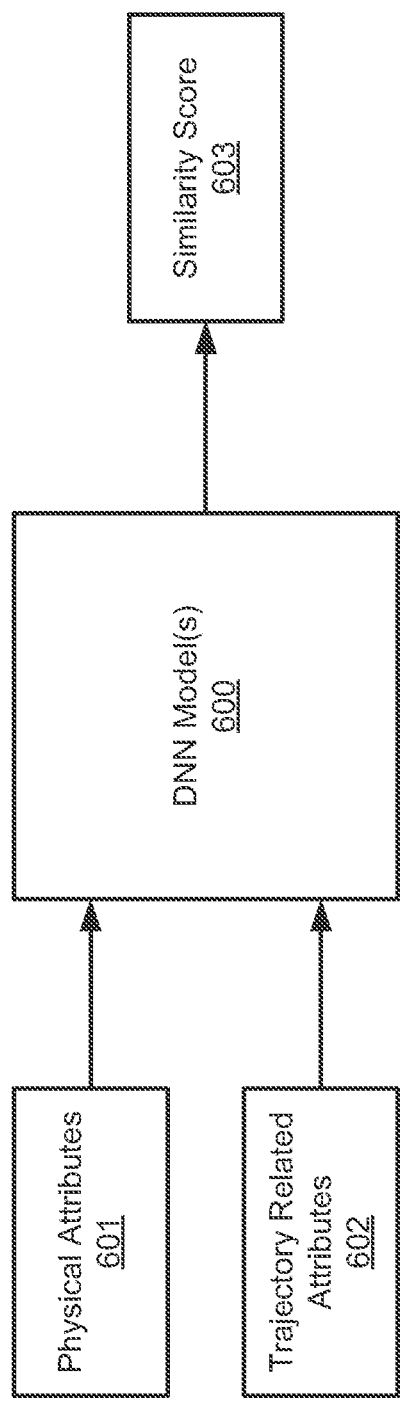
FIG. 6 is a block diagram illustrating an example of a deep neural network according to one embodiment.

In the example as shown in FIG. 5, a lane ID would sufficiently identify lane 500. A direction of lane 500 will be determined based on the direction of a reference line (typically a center line) 510 of lane 500 at the moment. For example, the lane direction at the moment represented by trajectory point 511 will be measured based on the angle of reference line corresponding to trajectory point 511. A distance between trajectory point 511 and the curbs of lane 500 will be measured based on the distance between trajectory point 511 and curb 503 and/or curb 504. The physical attributes and trajectory related attributes are then fed into one or more inputs of a DNN model as shown in FIG. 6.

A DNN is an artificial neural network (ANN) with multiple hidden layers between the input and output layers. Similar to shallow ANNs, DNNs can model complex non-linear relationships. DNN architectures generate compositional models where the object is expressed as a layered composition of image primitives. The extra layers enable composition of features from lower layers, giving the potential of modeling complex data with fewer units than a similarly performing shallow network. Deep architectures include many variants of a few basic approaches. Each architecture has found success in specific domains. It is not always possible to compare the performance of multiple architectures, because they have not all been evaluated on the same data sets Referring to FIG. 6, physical attributes 601 and trajectory related attributes 602 of known actual trajectories and known predicted trajectories are fed into inputs of DNN model 600 as positive examples and negative examples, respectively. An output of DNN model 600 produce similarity score 603 representing a difference between an actual trajectory and a predicted trajectory. The DNN model may be trained based on a large amount of features of a variety of trajectories. Given a known predicted trajectory and a known actual trajectory, a similarity score is obtained from the output of the DNN model. The similarity score is compared with an expected similarity score. If the calculated similarity score is not close enough to the expected similarity score, the DNN model will be iteratively trained until the calculated similarity score is within the expected similarity score.

The model can learn based on the predicted features in view of the corresponding features to produce a similarity score. The similarity score presents the difference or similarity between a trajectory represented by the predicted features and an actual trajectory represented by the actual features. A similarity score closer to a first predetermined value (e.g., 1) indicates that the predicted trajectory is similar to the corresponding actual trajectory. A similarity score closer to a second predetermined value (e.g., −1) indicates that the predicted trajectory is dissimilar to the corresponding actual trajectory. Using a large amount of predicted trajectories and corresponding actual trajectories, the DNN model or models can be trained to become more accurate.

Once DNN models 315 have been trained and created, referring back to FIG. 4, DNN models 315 can be used to evaluate future predictions represented by unknown predicted trajectories 415. The unknown predicted trajectories 415 may be predicted by a prediction module 303. In one embodiment, feature extractor 411 is configured to extract predicted features from at least some trajectory points of unknown predicted trajectory 415. The extracted features include a set of physical attributes and a set of trajectory related attributes as described above. The extracted features are then fed into DNN model 315 to produce a similarity score. Trajectory evaluation module 412 evaluates the performance of a prediction method or algorithm used by the prediction module.

For example, a similarity score closer to 1 indicates that the predicted trajectory is more likely close to the actual trajectory the corresponding object likely moves in the near future, which implies that the predicted method accurately predicts the potential movement of the object. Otherwise if the similarity score is closer to −1, it indicates that the actual trajectory deviates from the predicted trajectory, which implies that the predicted method may needs improvement. By using a DNN model to systematically generate a similarity score as an evaluation score, the predicted method for predicting trajectories of objects can be systematically evaluated. As a result, the predicted method or methods can be fine-tuned and improved based on the evaluation scores. In one embodiment, a similarity score is calculated for each of the selected trajectory points. An average of similarity scores of the selected trajectory points may be utilized to represent a final similarity score for the predicted trajectory. Similarly, an average of similarity scores of some or all of the predicted trajectories that were predicted using a particular prediction method may be utilized as a final evaluation score for the prediction method.

Figure 7:
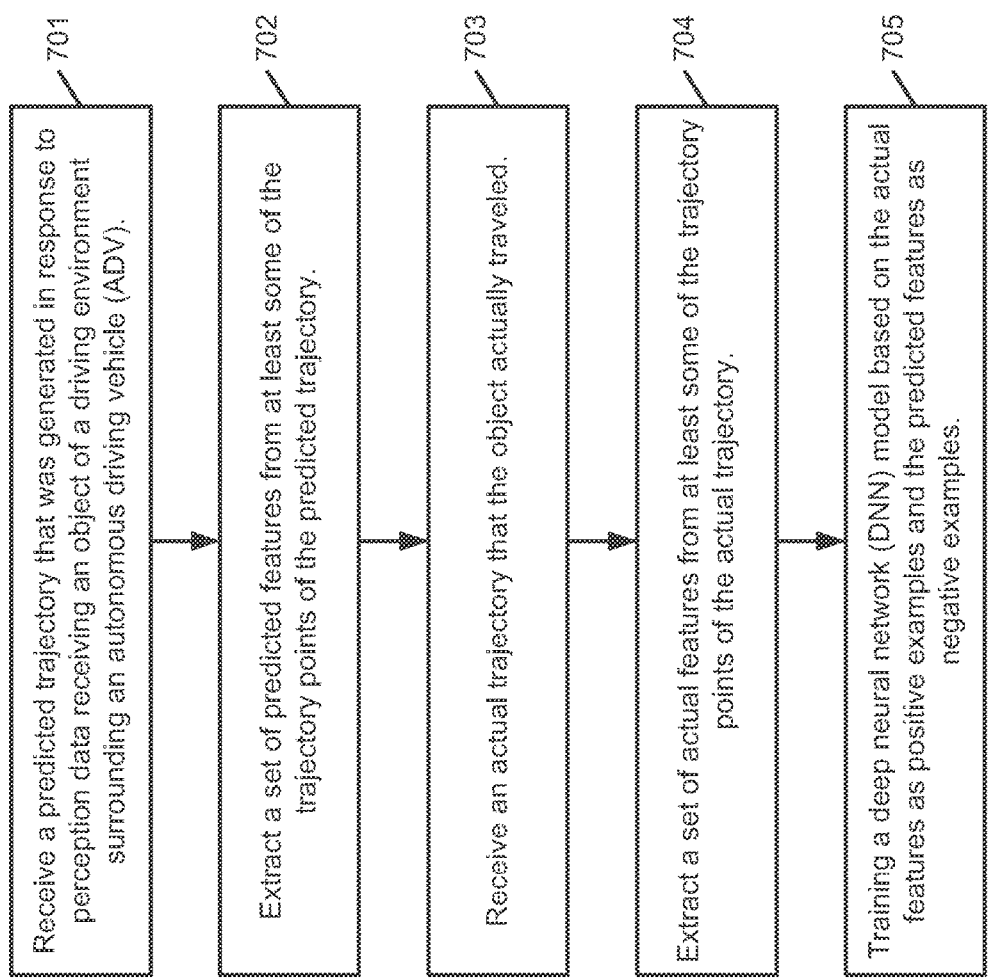
FIG. 7 is a flow diagram illustrating a process of training a deep neural network according to one embodiment.

FIG. 7 is a flow diagram illustrating a process of training a deep neural network for evaluating predicted trajectories according to one embodiment. Process 700 may be performed by processing logic which may include software, hardware, or a combination thereof. For example process 700 may be performed by system 400 of FIG. 4. Referring to FIG. 7, in operation 701, processing logic receives a predicted trajectory (e.g., known predicted trajectory) that was generated in response to perception data perceiving an object of a driving environment surrounding an ADV. In operation 702, processing logic extracts predicted features from at least some of the trajectory points of the predicted trajectory. In operation 703, processing logic receives an actual trajectory (e.g., known actual trajectory) of the object that the object actually traveled. In response, in operation 704, processing logic extracts actual features from at least some of the trajectory points of the actual trajectory. In operation 705, processing logic trains a DNN model based on the extracted predicted features as negative examples and the actual features as positive examples.

Figure 8:
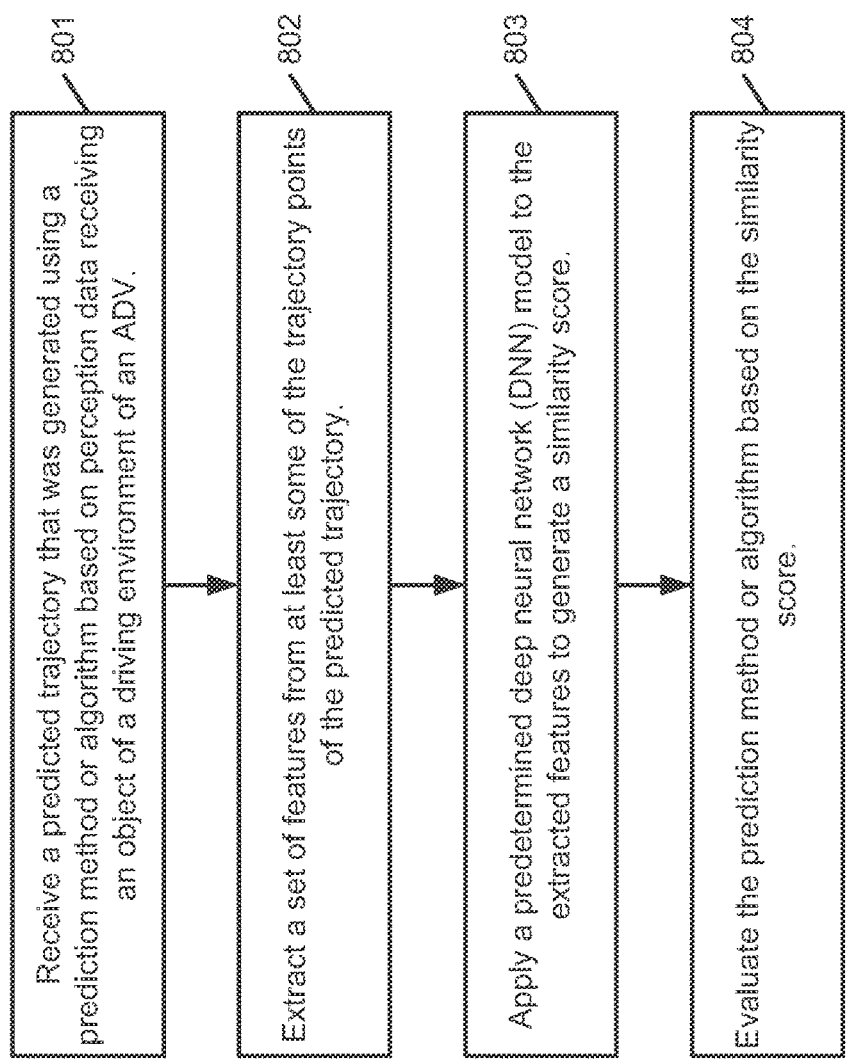
FIG. 8 is a flow diagram illustrating a process of evaluating a prediction method of autonomous driving according to one embodiment.

FIG. 8 is a flow diagram illustrating a process for evaluating predicted trajectories using a deep neural network according to one embodiment. Process 800 may be performed by processing logic which may include software, hardware, or a combination thereof. For example, process 800 may be performed by system 400 of FIG. 4. Referring to FIG. 8, in operation 801, processing logic receives a predicted trajectory (e.g., unknown predicted trajectory), which was generated using a prediction method or algorithm based on perception data perceiving a driving environment surrounding an ADV. For at least some of the trajectory points of the predicted trajectory, in operation 802, processing logic extracts a set of features from the selected trajectory points. In operation 803, processing logic applies a predetermined DNN model to the features to categorize the features and generate a similarity score. The similarity score represents the similarity between the predicted trajectory and one or more prior actual trajectories. In operation 804, processing logic determines a performance or accuracy of the prediction method or algorithm based on the similarity score.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
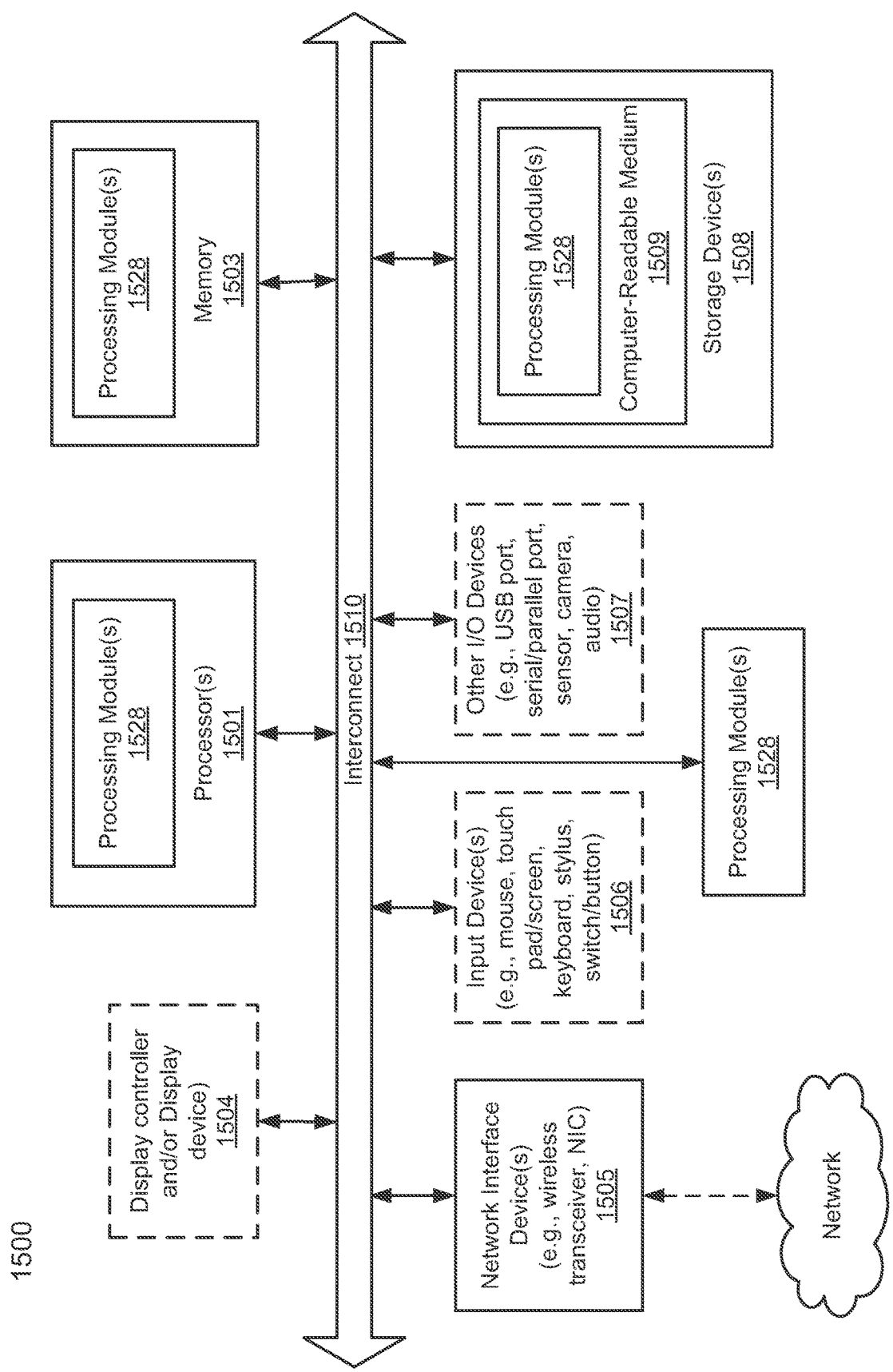
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1, and/or system 400 of FIG. 4. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, machine learning engine 122, and prediction evaluation module 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for evaluating predictions of trajectories by autonomous driving vehicles, the method comprising:

receiving, from an autonomous driving vehicle (ADV), a predicted trajectory of an object that was generated using a prediction method based on perception data perceiving the object within a driving environment surrounding the autonomous driving vehicle (ADV);

for at least some predicted trajectory points selected from a plurality of predicted trajectory points of the predicted trajectory by the ADV, extracting a plurality of features including predicted physical attributes of the object and predicted trajectory related attributes of the object from the selected trajectory points of the predicted trajectory;

evaluating, by a prediction evaluator, the prediction method that generated the predicted trajectory, by feeding the physical attributes of the object and the trajectory related attributes of the object to a deep neural network (DNN) model that is configured to generate a similarity score based on the physical attributes of the object and trajectory related attributes of the object, wherein the similarity score represents a similarity between the at least some predicted trajectory points of the predicted trajectory of the object and at least some actual trajectory points of an actual trajectory that was previously used to train the DNN model, the at least some predicted trajectory points of the predicted trajectory indicating the predicted physical attributes of the object including a predicted relative heading direction of the object and a predicted speed of the object and the predicted trajectory related attributes of the object, the at least some actual trajectory points of the actual trajectory indicating actual physical attributes of the object including an actual relative heading direction of the object and an actual speed of the object and actual trajectory related attributes of the object, wherein the DNN model and the prediction evaluator are both distinct from the prediction method of the ADV, and wherein the similarity score is an average of similarity scores between the at least some predicted trajectory points and the at least some actual trajectory points; and determining an accuracy of the predicted trajectory generated using the prediction method based on the similarity score.

2. The method of claim 1, the method further comprising:
in response to determining that the similarity score is closer to −1 than the similarity score is to 1, determining that a modified or improved prediction method is needed for the ADV,
wherein the received predicted trajectory is one of a plurality of predicted trajectories that were predicted by one or more ADVs using the prediction method.

3. The method of claim 1, wherein the ADV from which the predicted trajectory for the object was received also detects and stores the actual trajectory for the object.

4. The method of claim 3, wherein the predicted physical attributes of each trajectory point further comprise a predicted location of the trajectory point with respect to a starting point of the predicted trajectory and a predicted arrival time to reach the predicted trajectory.

5. The method of claim 1, wherein the predicted trajectory related attributes comprise:
a predicted lane identifier (ID) identifying a predicted lane in which the object is traveling;
a prediction whether the predicted lane is turning left or turning right; and
a predicted distance between the object and a curb of the predicted lane, and wherein the actual trajectory related attributes comprise:
an actual lane identifier (ID) identifying an actual lane in which the object is traveling;
an indication of whether the actual lane is turning left or turning right, and
an actual distance between the object and a curb of the actual lane.

6. The method of claim 5, wherein the predicted trajectory related attributes further comprise:
a predicted difference between a heading direction of the object and a lane direction of the predicted lane; and a predicted distance between the object and a reference line of the predicted lane.

7. The method of claim 2, further comprising generating the DNN model, wherein generating the DNN model comprises, for each of a large plurality of ADVs:
receiving, from the ADV, a second predicted trajectory of an object that was predicted based on perception data of the object;
extracting predicted features from the second predicted trajectory;
receiving, from the ADV, a second actual trajectory that the object actually travelled, the second actual trajectory for the object corresponding to the second predicted trajectory for the object;
extracting actual features of the second actual trajectory; and
training the DNN model based on the predicted features of the second predicted trajectory as negative examples and training the DNN based on the actual features of the second actual trajectory as positive examples.

8. A non-transitory machine-readable medium having instructions stored therein, which when executed by a processor, cause the processor to perform operations for evaluating predictions of trajectories by autonomous driving vehicles, the operations comprising:
receiving, from an autonomous driving vehicle (ADV), a predicted trajectory of an object that was generated using a prediction method of the ADV based on perception data perceiving the object within a driving environment surrounding the autonomous driving vehicle (ADV);
for at least some trajectory points selected from a plurality of trajectory points of the predicted trajectory by the ADV, extracting a plurality of features including physical attributes of the object and predicted trajectory related attributes of the object from the selected trajectory points of the predicted trajectory;
evaluating, by a prediction evaluator, the prediction method that generated the predicted trajectory by feeding the physical attributes of the object and the trajectory related attributes of the object to a deep neural network (DNN) model that is configured to generate a similarity score based on the physical attributes of the object and trajectory related attributes of the object, wherein the similarity score represents a similarity between the at least some predicted trajectory points of the predicted trajectory of the object and at least some actual trajectory points of an actual trajectory that was previously used to train the DNN model, the at least some predicted trajectory points of the predicted trajectory indicating the predicted physical attributes of the object including a predicted relative heading direction of the object and a predicted speed of the object and the predicted trajectory related attributes of the object, the at least some actual trajectory points of the actual trajectory indicating actual physical attributes of the object including an actual relative heading direction of the object and an actual speed of the object and actual trajectory related attributes of the object, wherein the DNN model and the prediction evaluator are both distinct from the prediction method of the ADV, and wherein the similarity score is an average of similarity scores between the at least some predicted trajectory points and the at least some actual trajectory points; and
determining an accuracy of the predicted trajectory generated using the prediction method based on the similarity score.

9. The machine-readable medium of claim 8, the operations further comprising:
in response to determining that the similarity score is closer to −1 than the similarity score is to 1, determining that a modified or improved prediction method is needed for the ADV;
wherein the received predicted trajectory is one of a plurality of predicted trajectories that were predicted by one or more ADVs using the prediction method, and the prediction evaluator and the DNN both reside on a server that is accessible by the ADV and the server is distinct from the ADV.

10. The machine-readable medium of claim 8, wherein the ADV from which the predicted trajectory for the object was received also detects and stores the actual trajectory for the object.

11. The machine-readable medium of claim 10, wherein the predicted physical attributes of each trajectory point further comprise a predicted location of the trajectory point with respect to a starting point of the predicted trajectory and a predicted arrival time to reach the predicted trajectory.

12. The machine-readable medium of claim 8, wherein the predicted trajectory related attributes, and wherein the trajectory related attributes comprise:
a predicted lane identifier (ID) identifying a predicted lane in which the object is traveling;
a prediction indication of whether the predicted lane is turning left or turning right; and
a predicted distance between the object and a curb of the predicted lane, and wherein the actual trajectory related attributes comprise:
an actual lane identifier (ID) identifying an actual lane in which the object is traveling;
an indication of whether the actual lane is turning left or turning right; and
an actual distance between the object and a curb of the actual lane.

13. The machine-readable medium of claim 12, wherein the predicted trajectory related attributes further comprise:
a predicted difference between a heading direction of the object and a lane direction of the predicted lane; and
a predicted distance between the object and a reference line of the predicted lane.

14. The machine-readable medium of claim 9, wherein the operations further comprise generating the DNN model, wherein generating the DNN model comprises, for each of a large plurality of ADVs:
receiving, from the ADV, a second predicted trajectory of an object that was predicted based on perception data of the object;
extracting predicted features from the second predicted trajectory;
receiving, from the ADV a second actual trajectory that the object actually travelled, the actual trajectory for the object corresponding to the second predicted trajectory for the object;
extracting actual features of the second actual trajectory; and
training the DNN model based on the predicted features of the second predicted trajectory as negative examples and training the DNN based on the actual features of the second actual trajectory as positive examples.

15. A data processing system, comprising:
a processor; and a memory coupled to the processor to store instructions, which when executed by the processor, cause the processor to perform operations for evaluating predictions of trajectories by autonomous driving vehicles, the operations including receiving, from an autonomous driving vehicle (ADV), a predicted trajectory of an object that was generated using a prediction method based on perception data perceiving the object within a driving environment surrounding the autonomous driving vehicle (ADV), for at least some trajectory points selected from a plurality of trajectory points of the predicted trajectory by the ADV, extracting a plurality of features including predicted physical attributes of the object and predicted trajectory related attributes of the object from the selected trajectory points of the predicted trajectory, evaluating, by a prediction evaluator, the prediction method that generated the predicted trajectory, by feeding the physical attributes of the object and the trajectory related attributes of the object to a deep neural network (DNN) model that is configured to generate a similarity score, wherein the similarity score represents a similarity between the at least some predicted trajectory of the predicted trajectory of the object and at least some actual trajectory points of an actual trajectory that was previously used to train the DNN model, the at least some predicted trajectory points of the predicted trajectory indicating the predicted physical attributes of the object including a predicted relative heading direction of the object and a predicted speed of the object and the predicted trajectory related attributes of the object, the at least some actual trajectory points of the actual trajectory indicating actual physical attributes of the object including an actual relative heading direction of the object and an actual speed of the object and actual trajectory related attributes of the object, wherein the DNN model and the prediction evaluator are both distinct from the prediction method of the ADV, and wherein the similarity score is an average of similarity scores between the at least some predicted trajectory points and the at least some actual trajectory points, and determining an accuracy of the predicted trajectory generated using the prediction method based on the similarity score.

16. The system of claim 15, the operations further comprising:

in response to determining that the similarity score is closer to −1 than the similarity score is to 1, determining that a modified or improved prediction method is needed for the ADV;

wherein the received predicted trajectory is one of a plurality of predicted trajectories that were predicted by one or more ADVs using the prediction method, and the prediction evaluator and the DNN both reside on a server that is accessible by the ADV and the server is distinct from the ADV.

17. The system of claim 15, wherein the predicted physical attributes include a predicted relative heading direction and a predicted speed of the trajectory point, and the ADV from which the predicted trajectory for the object was received also detects and stores the actual trajectory that is represented by the actual physical attributes of the object and the actual trajectory related attributes of the object, the actual physical attributes including an actual relative heading direction and an actual speed of the trajectory point.

18. The system of claim 17, wherein the predicted physical attributes of each trajectory point further comprise a predicted location of the trajectory point with respect to a starting point of the predicted trajectory and a predicted arrival time to reach the predicted trajectory.

19. The system of claim 15, wherein the predicted trajectory related attributes comprise:

a predicted lane identifier (ID) identifying a predicted lane in which the object is traveling;

a prediction of whether the predicted lane is turning left or turning right; and a predicted distance between the object and a curb of the predicted lane, and wherein the actual trajectory related attributes comprise:

an actual lane identifier (ID) identifying an actual lane in which the object is traveling, an indication of whether the actual lane is turning left or turning right; and an actual distance between the object and a curb of the actual lane.

20. The system of claim 19, wherein the predicted trajectory related attributes further comprise:

a predicted difference between a heading direction of the object and a lane direction of the lane; and a predicted distance between the object and a reference line of the predicted lane.

21. The system of claim 15, wherein the operations further comprise generating the DNN model, wherein generating the DNN model comprises, for each of a large plurality of ADVs:

receiving, from the ADV, a second predicted trajectory of an object that was predicted based on perception data of the object;

extracting predicted features from the second predicted trajectory;

receiving, from the ADV, a second actual trajectory that the object actually travelled, the second actual trajectory for the object corresponding to the second predicted trajectory for the object;

extracting actual features of the second actual trajectory; and training the DNN model based on the predicted features of the second predicted trajectory as negative examples and training the DNN based on the actual features of the second actual trajectory as positive examples.

* * * * *